United States Patent [19]

Katayama et al.

[11] Patent Number: 5,776,600

[45] Date of Patent: Jul. 7, 1998

[54] SLIDE MEMBER AND METHOD OF MANUFACTURING THE SAME

[75] Inventors: Tetsuya Katayama; Kaoru Murabe; Osamu Komura; Chihiro Kawai; Akira Yamakawa; Kenji Matsunuma; Norio Yasuoka; Matsuo Higuchi; Masaya Miyake, all of Itami, Japan

[73] Assignee: Sumitomo Electric Industries, Ltd., Osaka, Japan

[21] Appl. No.: 631,666

[22] Filed: Apr. 9, 1996

Related U.S. Application Data

[62] Division of Ser. No. 150,189, Mar. 29, 1993, filed as PCT/JP93/00385 published as WO93/20023 Oct. 14, 1993, Pat. No. 5,543,371.

[30] Foreign Application Priority Data

| Mar. 31, 1992 | [JP] | Japan | 4-77651 |
| Apr. 9, 1992 | [JP] | Japan | 4-89049 |
| Mar. 29, 1993 | [JP] | Japan | PCT/JP93/00385 |

[51] Int. Cl.$^6$ ............................ C04B 35/587
[52] U.S. Cl. ............ 428/325; 384/467; 384/469; 384/476; 428/403; 428/408; 428/698; 501/97; 501/98
[58] Field of Search ............ 501/97, 98; 428/325, 428/331, 403, 408, 698, 701, 702; 384/445, 467, 469, 476

[56] References Cited

U.S. PATENT DOCUMENTS

| 4,820,665 | 4/1989 | Ukai et al. |
| 4,879,263 | 11/1989 | Komeya et al. |
| 4,886,556 | 12/1989 | Suzuki et al. |
| 4,935,388 | 6/1990 | Lucek . |
| 5,002,907 | 3/1991 | Hayakawa et al. |
| 5,015,608 | 5/1991 | Matsuhisa et al. |
| 5,098,872 | 3/1992 | Suyama et al. |
| 5,217,931 | 6/1993 | Takami et al. |
| 5,234,642 | 8/1993 | Nishioka et al. |
| 5,308,561 | 5/1994 | Leimer et al. |
| 5,318,836 | 6/1994 | Ito et al. |
| 5,322,735 | 6/1994 | Fridez et al. ............... 428/357 |
| 5,543,371 | 8/1996 | Katayama et al. ............ 501/97 |

FOREIGN PATENT DOCUMENTS

| 0 454616 | 10/1991 | European Pat. Off. |
| 1-320255 | 12/1989 | Japan . |
| 01-321997 | 3/1990 | Japan . |
| 2-150504 | 6/1990 | Japan . |
| 2-204365 | 8/1990 | Japan . |
| 02-289476 | 2/1991 | Japan . |
| 2 170279 | 7/1986 | United Kingdom . |

OTHER PUBLICATIONS

JIS (Japanese Industrial Standard) JIS B 0601-1982.
WEAR Of $Si_3N_4$ Ceramics measured with various Testers; by Mikio Iwasa et al.; Yogyo Kyokai-shi vol. 93, 1985; pp. 73 to 80.

*Primary Examiner*—Marion E. McCamish
*Assistant Examiner*—Blaine R. Copenheaver
*Attorney, Agent, or Firm*—W. F. Fasse; W. G. Fasse

[57] ABSTRACT

A slide member has a sliding surface made of ceramic and a has surface roughness of not more than 1.0 μm in center line average roughness Ra. The ceramics includes a silicon nitride sintered body which contains crystal grains having a linear density of at least 35 per 30 μm in length with a boundary phase volume ratio of not more than 15 volume %, and which contains pores of not more than 20 μm in maximum diameter in a content of not more than 3%. In a method of manufacturing the slide member, it is possible to ensure smoothness of the sliding surface by grinding the sliding surface and thereafter heating the ceramic in an either an inert gas or atmospheric air. A slide member that can be used under severe sliding conditions of high-speed sliding or the like and that has excellent wear resistance is obtained. Even if the slide member is used for to a sliding part of a compressor or the like which employs a fluorocarbon containing no chlorine as a cooling medium, it is possible to prevent the occurrence of seizure and abnormal wear on the sliding surface.

26 Claims, 5 Drawing Sheets

SLIDE MEMBER AND METHOD OF MANUFACTURING THE SAME

CROSS-REFERENCE TO RELATED APPLICATION

This is a DIVISIONAL of U.S. patent application Ser. No. 08/150,189; filed as PCT/JP93/00385 Mar. 29, 1993 published as WO93/20023 Oct. 14, 1993, now U. S. Pat. No. 5,543,371, which issued on Aug. 6, 1996.

FIELD OF THE INVENTION

The present invention generally relates to a wear-resistant slide member and a method of manufacturing the same. More specifically, the invention relates to a slide member which can withstand severe sliding conditions of high-speed sliding or the like, and a slide member to be used in an atmosphere of a cooling medium, and a method of manufacturing the same.

BACKGROUND INFORMATION

Bearing members making sliding motions can be classified into those making a rolling motion and those making a sliding motion. A rolling bearing making the former rolling motion can be a ball bearing, for example. This ball bearing generally involves a complicated structure. Bearings making the latter sliding motion include contact type bearings (metal bush bearing and oil retaining bearing) and non-contact bearings (oil bearing, air bearing and magnetic bearing). These bearings have extremely simple structures as compared with the former rolling bearing. A slide bearing is widely used as a mechanical component, since its structure is simple. However, with increases in machine speed, problems of seizure and durability arise in a conventional slide bearing made of bearing steel. For this reason, ceramics have been carefully considered as a material for a slide member which is required to be wear-resistant under high-speed sliding. Furthermore in office automation products or the like, it has increasingly become required to use oil-free bearings to reduce the requirement for cleaning. Also in this field, ceramics has been watched with interest as a material for a slide member. As to such ceramics, $Al_2O_3$, $ZrO_2$, SiC, $Si_3N_4$, and the like are now being developed. In situations of oil-free high-speed sliding exceeding 1 m/sec., however, an impactive knock wear phenomenon is caused by contact between bearing members. In a conventional bearing body made of ceramics, therefore, it has been difficult to withstand such sliding.

On the other hand, a slide bearing body is also incorporated in a sliding part of a compressor of a refrigerator, a freezer or a car air conditioner. In this case, the sliding part of the bearing body is placed in a cooling medium. A chlorofluorocarbon (CFC), which is one of the fluorocarbons, has been employed as the cooling medium. In particular, a typical cooling medium of such a chlorofluorocarbon is CFC12. Chlorine (Cl) is included in molecules of this CFC12. This chlorine prevents adhesion and reaction of the slide member on a sliding surface. Namely, the chlorine prevents seizure between sliding surfaces or the like as an extreme pressure additive. Therefore, the CFC12 containing this chlorine itself serves as an extremely effective lubricant. Under a fluorocarbon atmosphere of CFC12 or the like containing chlorine, therefore, the sliding part of the slide member rarely seizes or causes abnormal wear. In general, therefore, a metal member of cast iron or the like has been used as a sliding part of a compressor of a refrigerator or the like, which is used in an atmosphere of a cooling medium. Under a fluorocarbon atmosphere containing chlorine, as hereinabove described, neither seizure nor abnormal wear of the sliding part has been caused even if a metal member of cast iron or the like is used as the sliding part.

In recent years, however, employment of chlorofluorocarbons, which are represented by CFC12, has been regulated to address the problem of destruction of the ozone layer in the stratosphere. This is because chlorine contained in the chlorofluorocarbons is one of the factors destroying the ozone layer. HFC134a containing no chlorine in its molecules, for example, is now expected to be used as a substitute for these chlorofluorocarbons. Thus, studies are now being conducted to investigate the use of fluorocarbons containing no chlorine as a cooling medium. In such a fluorocarbon containing no chlorine, however, no lubricating effect by chlorine can be expected. Thus, the problem arises that a metal such as cast iron used as a sliding part of a compressor or the like seizes to another metal or causes abnormal wear.

OBJECT OF THE INVENTION

The present invention solves the aforementioned problems, and an object thereof is to provide a slide member having high wear resistance, which can withstand severe slide conditions represented by those of high-speed sliding, or a slide member which hardly causes seizure and abnormal wear even in an atmosphere of a fluorocarbon containing no chlorine, and a method of manufacturing the same.

SUMMARY OF THE INVENTION

In consideration of the aforementioned problems of the prior art, the inventors have made various studies and have made the present invention by finding that an excellent sliding property can be attained under severe slide conditions of high-speed rotation or the like by controlling a sliding surface of a slide member.

Namely, a slide member according to one aspect of the present invention comprises a sliding surface which is made of ceramics and has a surface roughness of not more than 1.0 µm in center line average roughness Ra. Preferably, the sliding surface has a surface roughness of not more than 0.1 µm in center line average roughness Ra. The center line average roughness Ra is defined under JISB0601 (ISO468).

According to a preferred embodiment of the present invention, the ceramics is silicon ceramics, and more preferably, silicon ceramics including an $Si_3N_4$ phase. Further, the ceramics includes a silicon nitride sintered body containing crystal grains in a linear density of at least 35 per 30 µm in length with a boundary phase volume ratio of not more than 15 volume % and containing pores of not more than 20 µm in maximum diameter in a content of not more than 3%.

A sliding part structure according to another aspect of the present invention comprises a first slide member and a second slide member. The first slide member has one sliding surface. The second slide member has another sliding surface in contact with the one sliding surface. At least one of the sliding surfaces is made of ceramics, and has a surface roughness of not more than 1.0 µm in center line average roughness Ra.

According to still another aspect of the present invention, a method of manufacturing a slide member having a sliding surface made of ceramics and having a surface roughness of not more than 1.0 µm in center line average roughness Ra, comprises the following steps:

(a) grinding the sliding surface;

(b) heating the ceramics in either an inert gas or the atmospheric air after grinding the sliding surface.

According to a preferred embodiment of the method of manufacturing a slide member according to the present invention, the step of heating the ceramics is carried out at a temperature of at least 800° C. and not more than 1500° C.

A method of manufacturing a slide member according to a further aspect of the present invention comprises the following step, in addition to the aforementioned steps (a) and (b):

(c) polishing the aforementioned sliding surface after heating the aforementioned ceramics.

A slide bearing body is an example of the inventive slide member.

A slide member according to a further aspect of the present invention comprises a sliding surface which is placed in an atmosphere of a cooling medium containing fluorine, and the sliding surface is made of ceramics and has a surface roughness of not more than 1.0 µm in center line average roughness Ra.

Preferably, the sliding surface is provided with a film mainly composed of carbon. The film mainly composed of carbon may have been formed previously before being applied to the slide member. Alternatively, the film may be formed during sliding.

In the slide member according to the present invention, the center line average roughness Ra of the sliding surface is not more than 1.0 µm. Thus, it is possible to reduce the wear rate and the driving torque at the same rotational frequency as compared with the conventional slide member. More preferably, the center line average roughness Ra is reduced to 0.1 µm or less to attain a further advantageous effect.

The reasons for the above advantages can be explained as follows. When a surface of ceramics is subjected to machining such as grinding, surface imperfections such as surface roughening are formed. Such surface roughening may be a critical factor influencing the performance of a sliding material. When a fine irregularity of the surface is properly controlled and smoothed, then hardly any wearing powder results even if abrupt contacts of the sliding part or the like are caused by disturbances or the like. Namely, the wear rate is reduced. Thus, vibration that would be caused by the intervention of the worn powder in the sliding surface is suppressed. Therefore, it is possible to reduce the torque necessary for driving the slide member at least by such suppression of the vibration. Consequently, the slide member according to the present invention is capable of withstanding high-speed sliding. Depending on the structure of the sliding part or sliding conditions, it is also possible to prepare only one of a pair of members forming a pair of sliding surfaces which are in contact with each other from the aforementioned ceramics.

If the ceramics is silicon ceramics, a fine and dense surface layer of silica or the like is easily formed during sliding. Thus, an improvement in a sliding property such as a reduction of the coefficient of friction, for example, can be expected.

Particularly when the ceramics includes an $Si_3N_4$ phase, it is possible to obtain a sliding surface which is excellent in chipping resistance with no chipping resulting due to crystal grains falling out or the like in at least the surface of the ceramics forming the sliding surface. A slide member, in which at least a sliding surface is made of ceramics including an $Si_3N_4$ phase, also has excellent wear resistance against high-speed sliding accompanied by a knock wear phenomenon. Therefore, it is possible to suppress an increase of the required driving torque when correspondingly increasing the sliding speed.

When the sliding surface is formed of a sintered body including an $Si_3N_4$ phase, the silicon nitride sintered body contains crystal grains in a linear density of at least 35 per 30 µm in length with a boundary phase volume ratio of not more than 15 volume %, preferably not more than 10 volume %. Further, the silicon nitride sintered body contains pores of not more than 20 µm, preferably not more than 10 µm in maximum diameter, while the content of the pores is controlled at 3% or less. Therefore, the surface of the silicon nitride sintered body forming the sliding surface is not chipped by crystal grains falling out or the like, so is also excellent in chipping resistance. Thus, the slide member of a silicon nitride sintered body according to the present invention also has excellent wear resistance against high-speed sliding accompanied by a knock wear phenomenon.

In the method of manufacturing the slide member according to the present invention, it is preferable to perform heat treatment on the ceramics in an inert atmosphere or the atmospheric air after grinding the sliding surface. The reason for this will now be described.

In addition to surface roughening, fine microcracks of micron or submicron order and residual stress are introduced into the ground ceramics. These can also serve as critical factors influencing the performance of the slide member. When the ceramics is heated under an inert atmosphere or in the atmospheric air, reaction products are formed in the ceramics. The reaction products are $SiO_x$ (x: arbitrary positive integer) in Si ceramics, for example. Due to this heat treatment, further, atomic migration takes place in the ceramics through diffusion. Therefore, the microcracks are recombined and the defect is remedied by the above described formation of the reaction products or atomic migration, or a synergistic effect of these. In addition, this heat treatment also has an effect of removing residual stress.

Thus, it is possible to remove microcracks and residual stress from the ceramics by performing the heat treatment. Therefore, wear powder (i.e. powder produce by wear) is hardly caused by abrupt contact of a sliding part resulting from disturbance or the like. Thus, it is possible to suppress an increase of the required driving torque corresponding to an increase of the sliding speed.

The ceramics is preferably heated at a temperature of at least 800° C. and not more than 1500° C. It is possible to further facilitate formation of reaction products and atomic migration in the ceramics by heating the same at a temperature of at least 800° C. If the heating temperature exceeds 1500° C., on the other hand, the ceramics is unpreferably resintered to cause regrowth of the crystal grains.

When the sliding surface is polished after the ceramics is subjected to heat treatment, fragile reaction products formed on the surface are removed with the effect being the smoothing of the reaction products, whereby a slide member comprising a more stable sliding surface having disturbance resistance can be obtained.

When the inventive slide member is used for a slide bearing body, the driving torque is so reduced that a high-speed sliding motion is enabled with a small driving torque.

Further, the inventors have found that it is extremely effective to introduce ceramics into a slide member which is used in an atmosphere of a cooling medium containing fluorine, in order to prevent seizure and abnormal wear.

The reason why seizure and abnormal wear can be prevented can be explained as follows. Ceramics is superior in Young's modulus and inferior in chemical reactivity as compared with a metal material such as cast iron. Since the ceramics has a lower chemical reactivity, a reaction such as chemical adhesion is hardly caused on a sliding surface of a slide member containing ceramics. Thus, it is possible to prevent seizure and abnormal wear resulting from chemical adhesion or the like in a slide member containing ceramics. Therefore, the slide member containing ceramics also operates normally when the same is used in an atmosphere of a cooling medium containing fluorine, such as a fluorocarbon containing no chlorine.

The atmosphere of a cooling medium containing fluorine in the present invention may be a fluorocarbon in at least either a gas or a liquid form. Further, the cooling medium in the present invention may be at least either a hydrofluorocarbon (HFC) or a hydrochlorofluorocarbon (HCFC).

Molecular formulas of typical hydrofluorocarbons are shown in Table 1.

TABLE 1

| Code | Molecular Formula |
| --- | --- |
| HFC 32 | $CH_2F_2$ |
| HFC 125 | $CHF_2$—$CF_3$ |
| HFC 134 | $CHF_2$—$CHF_2$ |
| HFC 134a | $CHF_2F$—$CF_3$ |
| HFC 143a | $CH_3$—$CF_3$ |
| HFC 152a | $CH_3$—$CHF_2$ |
| HFC 227 | $CF_3$—$CHF$—$CF_3$ |

The slide member according to the present invention is also effective under an atmosphere of a hydrofluorocarbon other than those shown in Table 1.

Further, molecular formulas of typical hydrochlorofluorocarbons are shown in Table 2.

TABLE 2

| Code | Molecular Formula |
| --- | --- |
| HCFC 22 | $CHClF_2$ |
| HCFC 123 | $CHCl_2$—$CF_3$ |
| HCFC 124 | $CHClF$—$CF_3$ |
| HCFC 141b | $CH_3$—$CCl_2F$ |
| HCFC 142b | $CH_3$—$CClF_2$ |
| HCFC 225ca | $CF_3$—$CF_2$—$CHCl_2$ |
| HCFC 225cb | $CF_2Cl$—$CF_2$—$CHClF$ |

The ceramics forming the sliding surface according to the present invention is preferably at least one selected from a group of oxides, carbides, nitrides, borides and silicides. Tables 3 and 4 show typical monolithic ceramics and composite materials employing those ceramics.

TABLE 3

| Monolithic Ceramics | |
| --- | --- |
| Oxide | Alumina, Mullite, Spinel, Zirconia |
| Carbide | Silicon Carbide, Titanium Carbide |
| Nitride | Silicon Nitride, Aluminum Nitride, Titanium Nitride |
| Boride | Boron Nitride, Boron Carbide |
| Silicide | Titanium Silicide |

TABLE 4

| Composite Material | |
| --- | --- |
| Long Fiber Reinforced Composite | Carbon Fiber Reinforced Silicon Nitride, |

TABLE 4-continued

| Composite Material | |
| --- | --- |
| Material | Silicon Carbide Fiber Reinforced Silicon Nitride Alumina Fiber Reinforced Glass |
| Whisker Reinforced Composite Material | Silicon Carbide Whisker Reinforced Alumina, Silicon Carbide Whisker Reinforced Silicon Nitride |
| Particle Dispersion-Strengthened Composite Material | Titanium Nitride Particle Dispersion-Strengthened Silicon Nitride, Silicon Carbide Nanoparticle Dispersion-Strengthened Alumina, Silicon Carbide Nanoparticle Dispersion-Strengthened Silicon Nitride |

It is possible to use ceramics other than those shown in Tables 3 and 4 or a composite material employing such ceramics as the ceramics forming the sliding surface according to the present invention.

It is preferable that the slide member consists of a pair of members forming a pair of sliding surfaces which are in contact with each other, and at least one of the members is made of ceramics. In this case, one of the members forming the sliding surfaces must be made of ceramics, while the other member may be made of a metal, or may be prepared from a material such as the same or different types of ceramics, a carbon material, or a resin such as Teflon.

The inventors have found that there is a relation between surface roughness, seizure resistance and wear of a sliding surface of a slide member which is used in an atmosphere of a cooling medium containing fluorine. According to this, surface roughness of the sliding surface of the inventive slide member is preferably not more than 1.0 µm Ra. If the surface roughness of the sliding surface exceeds 1.0 µm Ra, one ceramics member may damage another metal member, or one and another ceramics members may cause abnormal wear, depending on the surface pressure of the sliding surface. When the surface roughness of the sliding surface is not more than 1.0 µm Ra, on the other hand, one ceramics member hardly damages another member or hardly causes abnormal wear with another member. The reason for this can be explained as follows.

When the surface roughness of the sliding surface of the slide member is made not more than 1.0 µm Ra, the irregularity on the sliding surface is reduced. Namely, the surface is smoothed. Thus, wear is hardly caused by abrupt contact of the sliding part resulting from disturbance or the like. Consequently, it is possible to suppress a mechanical frictional phenomenon by making the sliding surface not more than 1.0 µm Ra.

The inventors have also found that it is possible to attain a further effect by further smoothing the surface roughness of the sliding surface of the inventive slide member to be not more than 0.1 µm Ra. It has been recognized that an excellent low coefficient of friction is obtained particularly in an atmosphere of a cooling medium containing fluorine, to attain excellent wear resistance. This is conceivably because the irregularity, of the sliding surface can be further reduced by making the surface roughness not more than 0.1 µm Ra. Thus, it is possible to further suppress a mechanical frictional phenomenon even in an atmosphere of a cooling medium containing fluorine.

Further, the inventors have found that the sliding surface exhibits a low coefficient of friction and high wear resistance when a film which is mainly composed of carbon is formed on the sliding surface of the slide member. This is because friction and wear are reduced by a solid lubricating action of the carbon. Thus, it is possible to further reduce a mechanical frictional phenomenon even in an atmosphere of a cooling medium containing fluorine by forming a film which is mainly composed of carbon on the sliding surface.

The inventors have found that there is a relation between surface roughness and wear resistance of a slide member including a film mainly composed of carbon on its sliding surface. Accordingly, the surface roughness of the inventive slide member having the film mainly composed of carbon is preferably not more than 1.0 µm Ra. This is because one member may damage a film, mainly composed of carbon, which is formed on a surface of another member, or cause abnormal wear thereon depending on the surface pressure of the sliding surface if the surface roughness of the sliding surface exceeds 1.0 µm Ra. As a result, the solid lubricating action of the film may not be sufficiently attained.

Further, the inventors have found that it is possible to attain a low coefficient of friction and excellent wear resistance in an atmosphere of a cooling medium containing fluorine by making the surface roughness of the inventive slide member provided with a film, which is mainly composed of carbon, not more than 0.1 µm Ra. This is conceivably because it is possible to further reduce the irregularity of the sliding surface by making the surface roughness not more than 0.1 µm Ra. As a result, it is thereby possible to further reduce a mechanical frictional phenomenon even in an atmosphere of a cooling medium containing fluorine as the result.

The inventors have found a method of forming a film mainly composed of carbon on the sliding surface during sliding, by employing a material such as cast iron containing free carbon for one of the inventive sliding members. According to this method, the free carbon falls from the respective sliding member during an initial stage of sliding, to form a carbon film on the sliding surface of the other slide member. When the surface roughness of the sliding surface exceeds 1.0 µm Ra, the rate of wear exceeds the rate of formation of the film mainly composed of carbon, whereby no film is formed. When the surface roughness of the sliding surface is not more than 1.0 µm Ra, on the other hand, a film mainly composed of carbon is formed because hardly any wear is caused. Accordingly, it is possible to suppress a mechanical frictional phenomenon without coating the sliding surface with a material having solid lubricity such as carbon or molybdenum disulfide in advance of employment of the slide member.

Further, the inventors have found that it is possible to form a film mainly composed of carbon on the sliding surface during sliding in a cooling medium containing fluorine by making the surface roughness of the sliding surface not more than 0.5 µm Ra, thereby obtaining a sliding surface which has a lower coefficient of friction, and which is particularly excellent in wear resistance. This is based on the fact that it is possible to further reduce irregularity of the sliding surface by making the surface roughness not more than 0.5 µm Ra for enabling stable formation of a film mainly composed of carbon on the surface, whereby a solid lubricating action of the carbon is properly attained as the result. Thus, it is possible to further suppress a mechanical frictional phenomenon even in an atmosphere of a cooling medium containing fluorine.

More preferably, the aforementioned effect can be further remarkably implemented by making the surface roughness of the sliding surface not more than 0.1 µm Ra.

According to the present invention, as hereinabove described, a slide member is provided, which has excellent wear resistance, and which can be used under severe sliding conditions of high-speed sliding or the like.

Particularly in the slide member according to the present invention, it is possible to reduce surface roughening on the sliding surface by controlling the center line average roughness Ra of the sliding surface to not more than 1.0 µm. Thus, wear powder is hardly caused by abrupt contact of a sliding part resulting from disturbance or the like. Therefore, it is possible to suppress an increase of the required driving torque corresponding to an increase of a vibration frequency which is caused by wear powder. Consequently, the inventive slide member can withstand high speed sliding.

Further, it is possible to prevent seizure and abnormal wear even when the inventive slide member is used in an atmosphere of a cooling medium containing fluorine.

Figure 1:
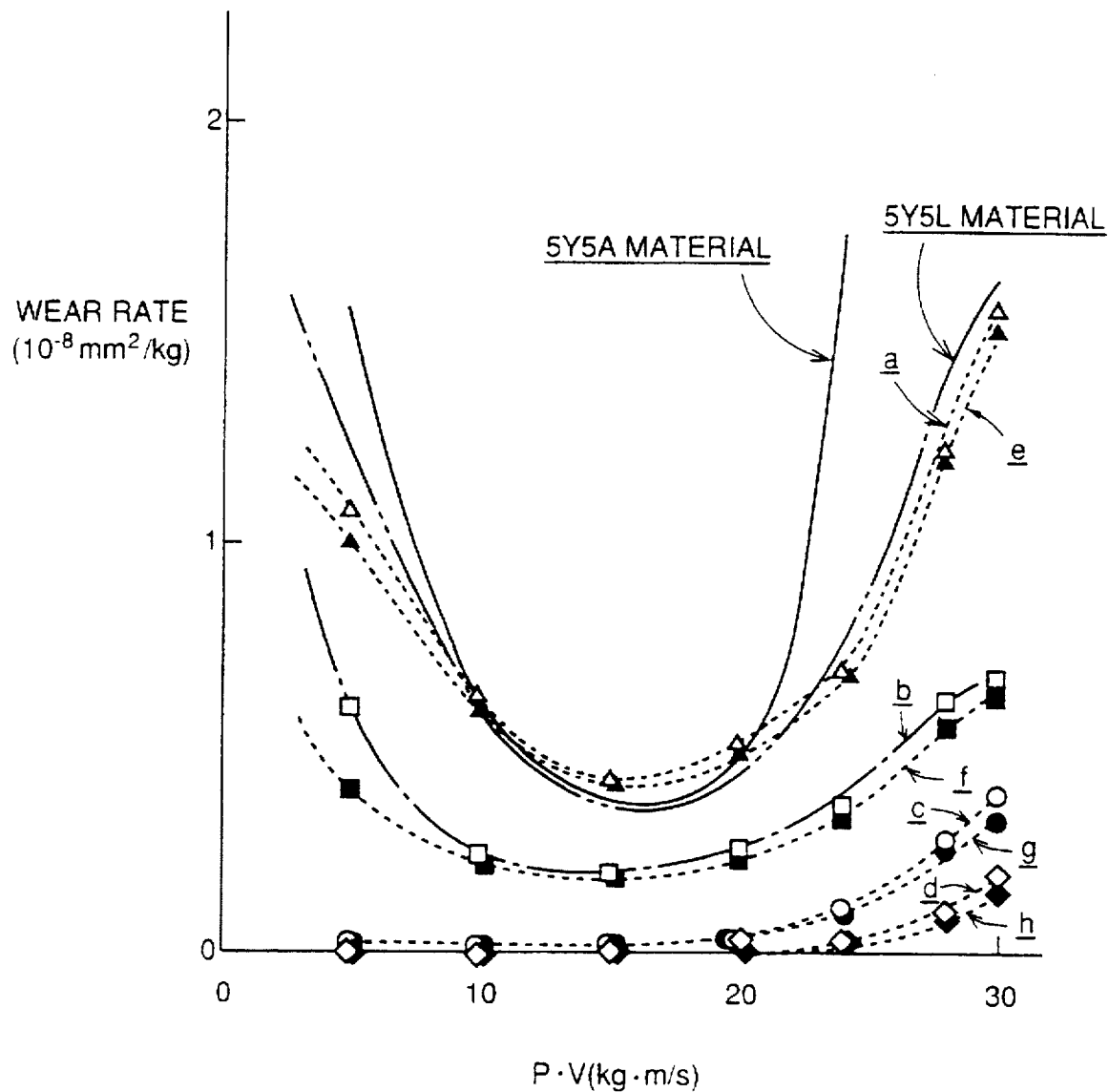
FIG. 1 is a graph showing results of an experiment of an Amsler abrasion test made on respective samples shown in Table 5.

DETAILED DESCRIPTION OF PREFERRED EXAMPLE EMBODIMENTS AND OF THE BEST MODE OF THE INVENTION

EXAMPLE 1

The inventors have made the following experiment on $Si_3N_4$ ceramics, which is excellent in toughness among ceramics materials.

First, raw material powder of $Si_3N_4$ having a mean particle diameter of 0.3 µm, particle size distribution 3σ=0.2 µm, an α crystallization rate of 96.5% and an oxygen content of 1.4 weight % was prepared. 92 weight % of this raw material powder of $Si_3N_4$ was mixed with 4 weight % of $Y_2O_3$ powder having a mean particle diameter of 0.8 µm, 3 weight % of $Al_2O_3$ powder having a mean particle diameter of 0.5 µm, and 1 weight % of AlN powder having a mean particle diameter of 1.0 µm. Utilizing a ball mill, these powder materials were wet-blended in ethanol for 100 hours. Thereafter the mixed powder was dried and then subjected to CIP (cold isostatic pressing) treatment under a pressure of 5000 kg/cm². The as-obtained compact was heated and held in a gaseous nitrogen atmosphere of 1 atm. at 1600° C. for 4 hours. Further, sintering treatment was performed on this compact at a temperature of 1750° C. for 6 hours, thereby obtaining a sintered body. Thereafter this sintered body was subjected to HIP (hot isostatic pressing)

treatment at a temperature of 1700° C. under a pressure of 1000 atm. in a gaseous nitrogen atmosphere for 2 hours.

The as-obtained $Si_3N_4$ sintered body contained crystal grains in a linear density of at least 35 per 30 μm in length and contained pores of not more than 20 μm in maximum diameter with a boundary phase volume ratio of not more than 15 volume %, and with porosity of not more than 3%. Further, this $Si_3N_4$ sintered body had a mean major axis particle diameter of not more than 5 μm, an aspect ratio of at least 4, and a maximum major axis particle diameter of not more than 15 μm. In addition, this sintered body had JIS three-point bending strength of at least 80 kg/mm$^2$, and a fracture toughness value of at least 5 MPa-m$^{1/2}$.

Sintered bodies having such characteristics were subjected to cylindrical grinding by a cylindrical grinder. Conditions employed for the grinding were a peripheral speed of 1400 m/min. and a feed rate of 260 m/min. Further, the grindstones of the cylindrical grinder were successively exchanged from that of 200 meshes/in. to that of 800 meshes/in., thereby finishing the surfaces of the sintered bodies to desired surface roughness levels. The obtained samples Nos. 1 to 4 are shown in the following Table 5.

After the above cylindrical grinding was performed, the sintered bodies were subjected to heat treatment in a heating furnace at a temperature of 1000° C. for 1 hour. Thereafter the sintered bodies were polished by a buffing machine under conditions of a peripheral speed of 1400 m/min. and a feed rate of 260 m/min., using a diamond lapping solution of 1500 meshes/in. in grain size as a polishing solution. The obtained samples Nos. 5 to 8 are shown in the following Table 5.

TABLE 5

| No. | Curve | Finished Surface Roughness Ra (μm) | Heat Treatment 1000° C. × 1 hr. | Mark |
|---|---|---|---|---|
| 1 | a | 2.0 μm | No | Δ |
| 2 | b | 1.0 | No | □ |
| 3 | c | 0.5 | No | ○ |
| 4 | d | 0.1 | No | ◇ |
| 5 | e | 2.0 | Yes | ▲ |
| 6 | f | 1.0 | Yes | ■ |
| 7 | g | 0.5 | Yes | ● |
| 8 | h | 0.1 | Yes | ♦ |

The samples Nos. 1 to 8 shown in Table 5 obtained in the aforementioned manner were subjected to wear resistance evaluation by an Amsler abrasion test. The Amsler abrasion test is a test employing two ring-type test samples (outer diameter of φ16 mm by inner diameter of φ30 mm by thickness of 8 mm) and making a sliding test with a prescribed load P and a rotational speed V and thereafter measuring weight reduction values of the samples, thereby evaluating wear resistance.

FIG. 1 is a graph showing the results of the experiment involving an Amsler abrasion test on the respective samples shown in Table 5. Referring to FIG. 1, the axis of abscissas shows products (P-V values) of loads P and rotational speeds V. Further, the axis of ordinates shows wear rates. Marks such as ○ and ● appearing in the figure correspond to the respective samples shown in Table 5. For the purpose of comparison, FIG. 1 also shows the results of 5Y5A and 5Y5L materials, which are Si3N4 sintered bodies indicated in Yogyo Kyokai-Shi, Vol. 93, 1985, p. 73, in solid and two-dot chain lines respectively. As can be seen from this figure, wear resistance is improved as surface roughness Ra is reduced. Further, it is understood that wear resistance of the sintered body is further improved when heat treatment is performed at a temperature of 1000° C. for 1 hour. In addition, it is understood that an effect of improving wear resistance is remarkable when surface roughness is not more than 1.0 μm in Ra.

As hereinabove described, it has been proved that an $Si_3N_4$, sintered body having finished surface roughness Ra of not more than 1.0 μm is extremely excellent in wear resistance. Further, it has also been proved that the wear resistance is further improved by performing heat treatment on this Si3N4 sintered body.

It has also been confirmed that an improved wear resistance can also be similarly attained when the aforementioned treatment is performed on Al or Zr ceramics, under conditions that do not change the original mechanical properties (bending strength, for example) of the material. Therefore, the aforementioned treatment for controlling surface roughness is applicable to all ceramics.

Then, the performance attained when using the inventive slide member as a bearing body was examined.

First, $Si_3N_4$ sintered bodies obtained in the aforementioned method were employed as the materials for bearing bodies. As hereinabove described, the sintered bodies which were subjected to HIP treatment were surface-ground by a surface grinder. Conditions employed for this grinding were a peripheral speed of 1800 m/min. and a feed rate of 260 m/min. Further, grindstones of the surface grinder were successively exchanged from that of 200 meshes/in. to that of 800 meshes/in., thereby finishing the surfaces of the sintered bodies to desired surface roughness levels. Thus, respective samples were prepared. Some of the samples were subjected to heat treatment in a heating furnace at a temperature of 1000° C. for 1 hour after the surface grinding. Further, other ones of the samples were subjected to buffing as a method of polishing. A diamond lapping solution of 1500 meshes/in. in grain size was employed as a polishing solution under conditions of a peripheral speed of 1800 r.p.m. and a feed rate of 260 m/min., to polish the samples using a buffing machine. Thus, the samples shown in the following Table 6 were obtained.

TABLE 6

| | Surface Roughness (Ra) | Heat Treatment Condition | Treatment after Grinding | Mark | Remarks |
|---|---|---|---|---|---|
| A0 | 2.0 μm | — | — | ■ | Conventional Material |
| A1 | 2.0 μm | 1000° C. for 1 Hour in Atmospheric Air | Polish | □ | Comparative Material |
| B0' | 1.0 μm | — | — | ▼ | Developed Material |
| B1' | 1.0 μm | 1000° C. for 1 Hour in Atmospheric Air | — | ∇ | Developed Material |
| B0 | 1.0 μm | — | Polish | ▲ | Developed Material |
| B1 | 1.0 μm | 1000° C. for 1 Hour in Atmospheric Air | Polish | Δ | Developed Material |
| C0 | 0.5 μm | — | — | ● | Developed Material |
| C1 | 0.5 μm | 1000° C. for 1 Hour in Atmospheric Air | Polish | ○ | Developed Material |
| D0 | 0.08 μm | — | — | ♦ | Developed Material |
| D1 | 0.08 μm | 1000° C. for 1 Hour in Nitrogen Air | — | ◇ | Developed Material |

The aforementioned samples shown in Table 6 were employed to form bearing bodies.

Figure 2:
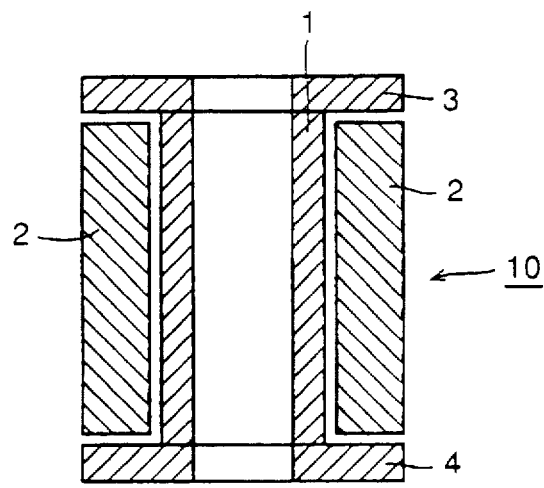
FIG. 2 is a schematic sectional diagram showing the structure of a composite bearing body for testing the sliding properties of the respective samples shown in Table 6 used as bearing members.

FIG. 2 is a schematic diagram showing the structure of a composite bearing body and for testing the performance of a bearing body. Referring to FIG. 2, the composite bearing body 10 is formed by an inner ring 1, an outer ring 2 and thrust plates 3 and 4. The inner ring 1 has a cylindrical shape, to enclose an outer peripheral surface of a prescribed shaft. The thrust plates 3 and 4 are set to be in contact with both end surfaces of the inner ring 1. The outer ring 2 is adjusted to maintain prescribed clearances with respect to the inner ring 1 and the thrust plates 3 and 4. Further, the clearances are adjusted to fine values, in order to maintain radial rotation accuracy during high-speed rotation.

Figure 3:
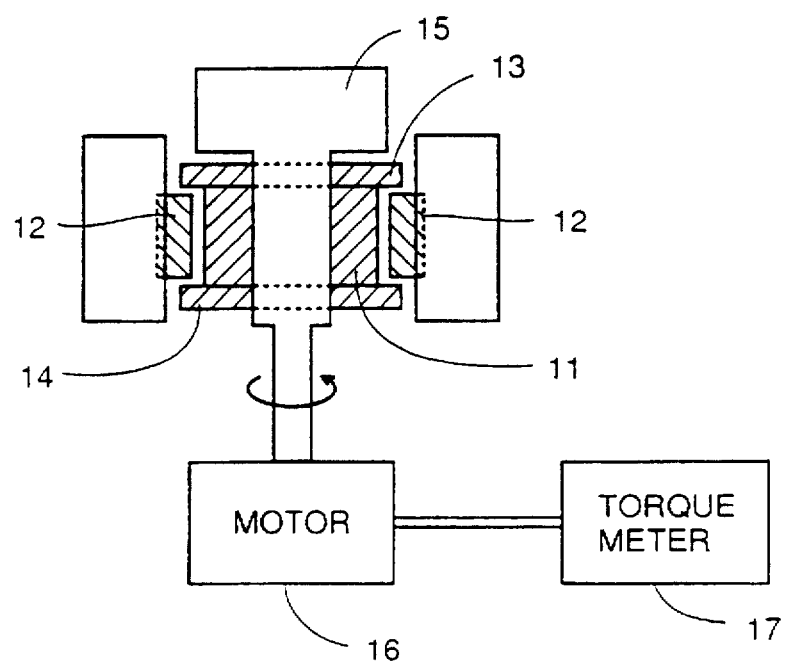
FIG. 3 is a schematic diagram showing the structure of a performance evaluation tester employing the composite bearing body shown in FIG. 2.

FIG. 3 is a schematic diagram showing the structure of an evaluation tester for evaluating the performance of the aforementioned composite bearing body. The composite bearing body is formed by an inner ring 11, an outer ring 12 and thrust plates 13 and 14. A respective composite bearing body is formed from each sample of the $Si_3N_4$ ceramics sintered body shown in Table 6. The outer ring 12 is so provided as to maintain a prescribed clearance with respect to the inner ring 11. Further, this outer ring 12 also maintains prescribed clearances with respect to the thrust plates 13 and 14. The inner ring 11 to which the thrust plates 13 and 14 are bonded is provided with a hole having an inner diameter of 10 mm from its cylindrical upper surface to its cylindrical lower surface. A rotator 15 is fitted in this hole. The inner ring 11 is rotatable with this rotator 15. The rotator 15 is set to be rotatable by a motor 16. Driving torque of this motor 16 is measured by a torque meter 17.

The bearing performance evaluation tester is constructed in the aforementioned manner. This bearing performance evaluation tester was employed for making the rotational frequency of the rotator 15 reach a set value, thereafter maintaining the rotational frequency for 10 minutes, and then measuring the driving torque at that time using the torque meter 17.

Figure 4:
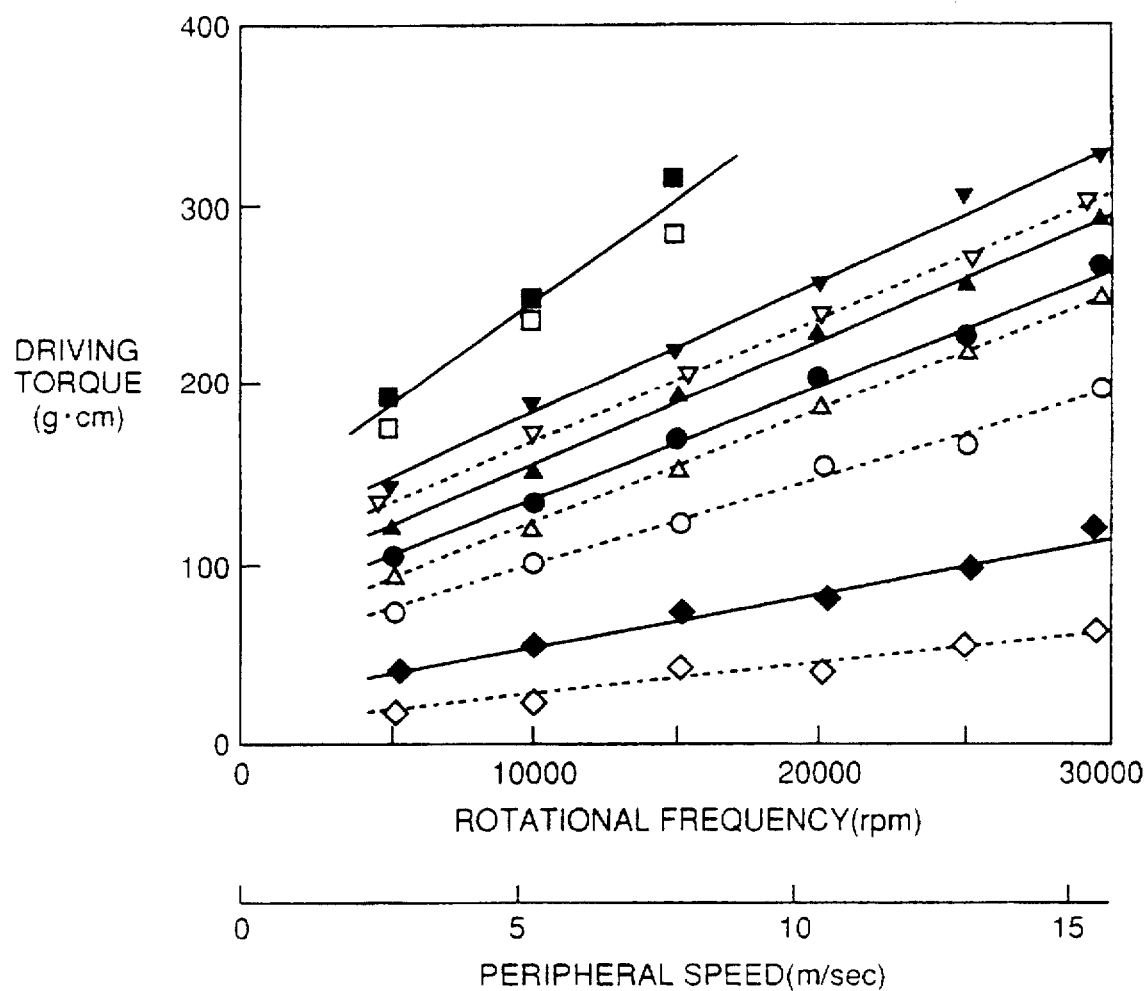
FIG. 4 is a graph showing the results of an experiment for performance evaluation of composite bearing bodies formed by the respective samples of Table 6.

FIG. 4 is a graph showing the results of the driving torque of rotators measured using composite bearing bodies which were formed by the respective samples of Table 6. Referring to FIG. 4, marks such as ○ and ● appearing in the figure correspond to the respective samples of Table 6. The axis of abscissas shows rotational frequencies (r.p.m.) of the rotators supported by the respective composite bearing bodies (or, peripheral speeds (m/sec.) in inner peripheral surfaces of the inner rings). The axis of ordinates shows driving torque values (g·cm). As can be seen from this figure, it is understood that the ratio of an increase rate of the driving torque to that of the rotational frequency (peripheral speed) is reduced as the surface roughness Ra after grinding is reduced. It is also understood that the ratio of the increase rate of the driving torque to that of the rotational frequency is reduced by performing heat treatment, and also further reduced in the samples subjected to buffing as a method of polishing. In the samples A0 and A1, seizure occurred in sliding parts when the rotational frequencies exceeded 15000 r.p.m.

From the aforementioned results, it is understood that the increase of driving torque related to an increase of the rotational speed can he extremely suppressed in each sample having surface roughness Ra of not more than 1.0 µm.

As representative practical examples, the inventive slide member can be used for a bearing for an office automation product which is required to rotate at a high speed, a turbine bearing for a supercharger which rotates at a high speed of 80000 to 150000 r.p.m., a bearing for a turbine or a compressor which rotates at a high speed of 20000 to 30000 r.p.m., a bearing for high-speed rotation which is employed for a rocket engine turbo-pump, a bearing which is employed for a machine tool such as a CNC ultraprecise lathe, an ultraprecise lathe for cylindrical working or an ultraprecise surface grinder, and the like.

EXAMPLE 2

A method of manufacturing a silicon nitride sintered body as a material for a slide member according to an example of the present invention will now be described.

Raw material powder of $Si_3N_4$ having a mean particle diameter of 0.3 µm, grain size distribution of 3σ=0.20 µm, an a crystallization rate of 96.5% and an oxygen content of 1.4 weight % was prepared. 92 weight % of this $Si_3N_4$ raw material powder, 4 weight % of $Y_2O_3$ powder having a mean particle diameter of 0.8 µm, 3 weight % of $Al_2O_3$ powder having a mean particle diameter of 0.5 µm and 1 weight % of MgO powder having a mean particle diameter of 1.0 µm, were wet-blended in ethanol for 100 hours using a ball mill. Thereafter a mixed powder obtained by drying the above wet-blended substance was subjected to CIP (cold isostatic press) molding under a pressure of 5000 kg/cm². The as-obtained compact was heated and held under a gaseous nitrogen atmosphere of 1 atm. at a temperature of 1600° C. for 4 hours. Further, sintering treatment was performed at a temperature of 1750° C. for 6 hours, to obtain a sintered body. Thereafter HIP (hot isostatic press) treatment of 2 hours was performed on this sintered body at a temperature of 1700° C. in a gaseous nitrogen atmosphere of 1000 atm.

In the silicon nitride sintered body obtained in the aforementioned manner, the mean major axis particle diameter was not more than 5 µm, the aspect ratio of crystal grains thereof was at least 4, and the maximum major axis particle diameter was not more than 15 µm. This sintered body had mechanical properties of JIS three-point bending strength of at least 80 kg/mm² and a fracture toughness value of at least 5 MPa-m$^{1/2}$. Test pieces were cut from the as-obtained sintered body, to evaluate wear resistance levels in accordance with an Amsler abrasion test.

Figure 5:
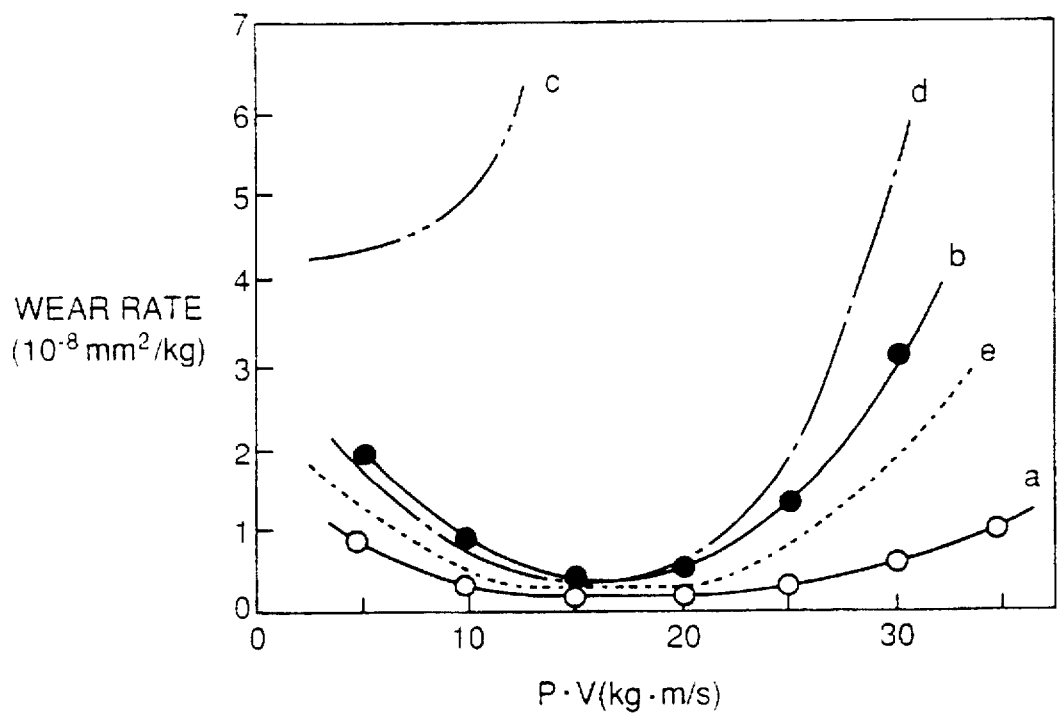
FIGS. 5A and 5E are graphs (A) and (B) showing relations between wear rates and P•V values of sintered bodies forming the inventive slide members with those of conventional and comparative examples.
Figure 5:
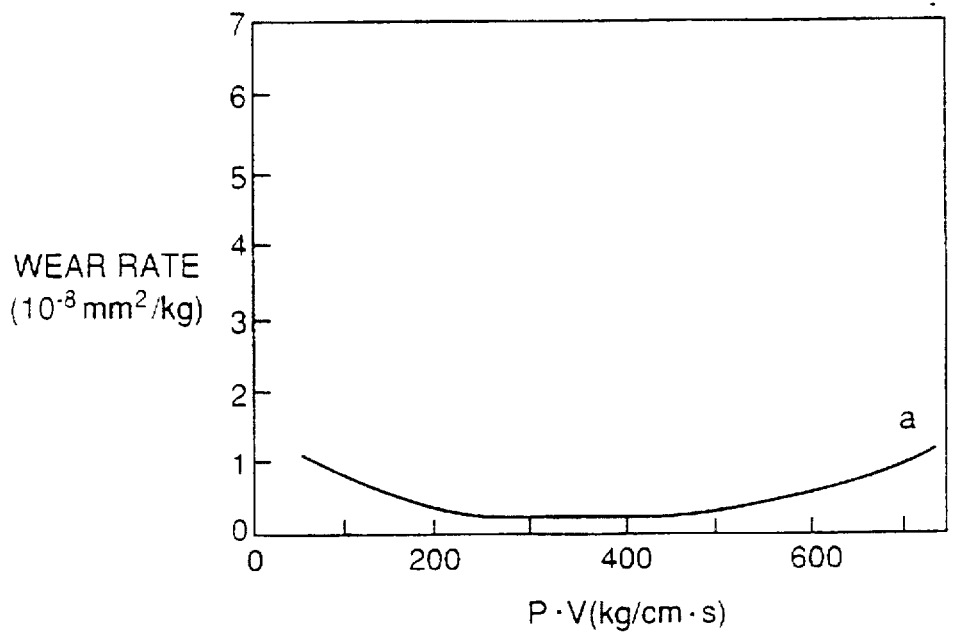

FIG. 5A is a graph showing relations between products (P·V) of loads (P) applied to the samples and rotational speeds (V), and the resultant wear rates. Referring to FIG. 5A, respective curves a to e show results of measurement obtained by the following samples:

a: Inventive Sample

A silicon nitride sintered body obtained by the aforementioned manufacturing method, having a crystal grain linear density of 40 per 30 µm in length, a boundary phase volume ratio of 8 volume %, a porosity of 0.05%, and a maximum pore diameter of 8 µm.

b: Comparative Sample

A silicon nitride sintered body obtained by the aforementioned manufacturing method, having a crystal grain linear density of 30 per 30 µm in length, a boundary phase volume ratio of 16 volume %, a porosity of 3.2%, and a maximum pore diameter of 22 µm.

c, d and e: Conventional Samples

Samples of silicon nitride sintered bodies shown in Yogyo Kyokai-shi, Vol- 93, 1985, pp. 73 to 80 (FIG. 3, in particular).

The Amsler abrasion test was conducted by fixing two ring-shaped samples (inner diameter of φ16 mm by outer diameter of φ30 mm by thickness of 8 mm) to a rotary shaft of a tester in such an arrangement that respective circumferential surfaces were correctly in contact with each other, applying a prescribed load and driving the rotary shaft at a prescribed rotational frequency to carry out a sliding test of about 100,000 revolutions, and thereafter measuring the respective degrees or amounts of weight reduction of the two samples.

As clearly understood from FIG. 5A, the sintered body according to the present invention is extremely excellent in wear resistance. FIG. 5B shows the value of P·V (kg·m/s) of FIG. 5A converted or normalized per unit area of sliding surface.

EXAMPLE 3

An Amsler abrasion test was carried out in liquid HFC134a, using sintered bodies of the inventive sample a and the comparative sample b obtained in Example 2. At this time, the abrasion test was carried out under the same load and rotational frequency conditions as Example 2, in such a manner that contact portions of two ring-shaped samples (outer diameter of 16 mm by inner diameter of 30 mm by thickness of 8 mm) were dipped in the liquid HFC134a.

Figure 6:
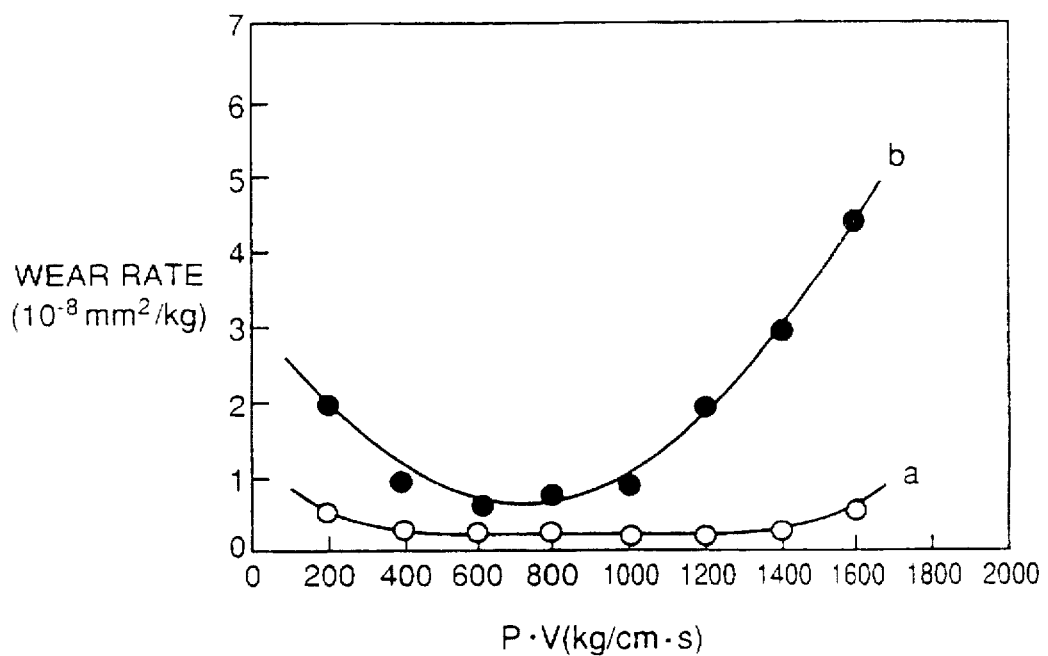
FIG. 6 is a graph showing relations between wear rates and P•V values of sintered bodies forming the inventive slide members in a substitutional fluorocarbon with those of comparative examples.

FIG. 6 is a graph showing relations between products (P·V) of the loads (surface pressures (P)) applied to the samples and the rotational speeds (V), and the resultant wear rates. As can be seen from FIG. 6, it is understood that the sintered body according to the present invention is also extremely excellent in wear resistance in an environment of a substitutional fluorocarbon.

EXAMPLE 4

Rings were respectively prepared from sintered bodies of the inventive sample a and the comparative sample b obtained in Example 2, bearing steel and high-speed steel. Rings having sliding surfaces whose surface roughness levels were adjusted to 0.01, 0.1, 0.5 and 3 μm Ra respectively were prepared from each material. Rings of spheroidal graphite cast iron were prepared as counter materials for sliding with respect to these rings. The respective rings having various surface roughness levels of the sliding surfaces and the rings of spheroidal graphite cast iron were arranged to slide in a three-type mixture substitutional fluorocarbon solution of HCFC22/HFC152a/HCFC124. At this time, seizure loads were measured using a ring-on-ring friction tester while varying the loads, with a peripheral speed of 2 m/sec. Each seizure load was determined at a point of time when an echo was generated during the test and vibration of the tester took place. The results are shown in Table 7.

TABLE 7

| Sliding Surface | Seizure Load (kg/cm²) | | | |
|---|---|---|---|---|
| Roughness | 3 μmRa | 0.5 μmRa | 0.1 μmRa | 0.01 μmRa |
| Sample | | | | |
| Sintered Body of Inventive Sample a | 49 | 103 | 152 | 185 |
| Sintered Body of Comparative Sample b | 23 | 47 | 72 | 86 |
| Bearing Steel | 2 | 5 | 8 | 12 |
| High-Speed Steel | 2 | 6 | 9 | 14 |

As can be seen from Table 7, it has been proved that a high seizure load can be attained by using a slide member formed by the sintered body of the inventive sample a, and an especially higher seizure load can be attained when surface roughness is reduced to not more than 1.0 μm Ra, and further reduced to not more than 0.1 μm Ra.

EXAMPLE 5

Shoes to be in contact with swash plates made of an Al-Si alloy in swash plate compressors for car air conditioners were formed by sintered bodies of the inventive sample a and the comparative sample b obtained in Example 2. These shoes were employed for evaluating peripheral speeds at which seizure between the shoes and the swash plates occurred while using HFC134a as a cooling medium and polyalkylene glycol as a lubricant. Surface roughness levels of the sliding surfaces of the shoes were set at 0.1 μm Ra. Occurrence of seizure was determined by generation of an abnormal noise and an abnormal increase of a driving current value. The results are shown in Table 8.

TABLE 8

| Sample | Seizure Peripheral Speed (m/sec.) |
|---|---|
| Sintered Body of Inventive Sample a | 18 |
| Sintered Body of Comparative Sample b | 8 |

As can be seen from Table 8, it has been proved that seizure occurs at a high peripheral speed when a shoe made of the sintered body according to the inventive sample is employed.

Although a sliding component for a compressor has been evaluated and described as an example of the inventive slide member, the present invention is not restricted thereto. The slide member according to the present invention can also be used for a turbine bearing for a supercharger which rotates at a high speed of 80000 to 150000 r.p.m., a bearing employed for a turbine which rotates at a high speed of 20000 to 30000 r.p.m., a machine tool such as a CNC ultraprecise lathe, an ultraprecise lathe for cylindrical working or an ultraprecise surface grinder, or the like.

EXAMPLE 6

Rings of spheroidal graphite cast iron were prepared as first members forming sliding surfaces. Further, rings were respectively prepared from spheroidal graphite cast iron, bearing steel, alumina, silicon carbide, silicon nitride, boron nitride, carbon fiber reinforced silicon nitride, silicon carbide whisker reinforced alumina, and silicon carbide nanoparticle dispersion-strengthened alumina as second members forming the sliding surfaces. The first and second rings were arranged and driven to slide for measuring seizure loads while varying the applied loads in a liquid of HFC134a with a peripheral speed of 2 m/sec., using a ring-on-ring tester. Table 9 shows the results of this experiment. Sample Nos. 1—1 to 1-7 are inventive samples, and Sample Nos. 1-8 and 1-9 are comparative samples.

TABLE 9

| No. | | Sliding Material | Seizure Load (kg/cm²) |
|---|---|---|---|
| Inventive Sample | 1-1 | Alumina | 56 |
| | 1-2 | Silicon Carbide | 72 |
| | 1-3 | Silicon Nitride | 87 |
| | 1-4 | Boron Nitride | 103 |
| | 1-5 | Carbon Fiber Reinforced Silicon Nitride | 92 |
| | 1-6 | Silicon Carbide Whisker Reinforced Alumina | 75 |
| | 1-7 | Silicon Carbide Nanoparticle Dispersion-Strengthened Alumina | 79 |
| Comparative Sample | 1-8 | Spheroidal Graphite Cast Iron | 2 |
| | 1-9 | Bearing Steel | 5 |

As can be seen from the results shown in Table 9, it has been proved that the seizure loads were extremely high in the inventive samples, in which the first members forming the sliding surfaces were made of ceramics (monolithic ceramics, composite materials), as compared with the comparative samples. Thus, it has been recognized that seizure is hardly caused in the inventive samples even in an atmosphere of a cooling medium containing fluorine.

Further, the sliding surfaces were examined in detail, whereby it was found that films mainly composed of carbon were formed on the surfaces. Each of the films mainly composed of carbon contained about 70 weight % of carbon (C), about 20 weight % of hydrogen (H) and a remainder i.e. about 10 weight % made of elements forming the slide member.

EXAMPLE 7

Rings were respectively prepared from mullite, silicon carbide, silicon nitride, aluminum nitride, boron carbide, alumina fiber reinforced crystallized glass, silicon carbide whisker reinforced silicon nitride, silicon carbide nanoparticle dispersion-strengthened silicon nitride, flake graphite cast iron and aluminum. Each pair of rings of the same material was arranged and driven to slide with each other, for measuring the seizure load in a three-type mixture substitutional fluorocarbon solution of HCFC22/HFC152a/HCFC124 using a ring-on-ring tester under a peripheral speed of 3 m/sec. while varying the load. In this measurement, the surface roughness levels of the sliding surfaces were varied in a range of 0.01 to 3 μm Ra, to evaluate seizure loads at respective surface roughness levels. In the case of a pair of ceramic rings sliding with each other, a seizure load was determined at a point of time when an echo was generated during the test and vibration took place in the tester. The results of this experiment are shown in Table 10. Referring to the Table, Sample Nos. 2–1 to 2–8 are inventive samples, and Sample Nos. 2–9 and 2–10 indicate comparative samples.

TABLE 10

| | Sliding | Seizure Load (kg · cm²) Sliding Surface Roughness | | | |
|---|---|---|---|---|---|
| No. | Material | 3 μmRa | 0.5 μmRa | 0.1 μmRa | 0.01 μmRa |
| Inventive Sample | | | | | |
| 2-1 | Mullite | 25 | 61 | 88 | 110 |
| 2-2 | Silicon Carbide | 37 | 80 | 115 | 146 |
| 2-3 | Silicon Nitride | 43 | 95 | 143 | 178 |
| 2-4 | Aluminum Nitride | 31 | 72 | 102 | 127 |
| 2-5 | Boron Carbide | 39 | 83 | 117 | 146 |
| 2-6 | Alumina Fiber Reinforced Crystallized Glass | 33 | 75 | 103 | 125 |
| 2-7 | Silicon Carbide Whisker Reinforced Silicon Nitride | 43 | 91 | 139 | 172 |
| 2-8 | Silicon Carbide Nanoparticle Dispersion-Strengthened Silicon Nitride | 42 | 89 | 128 | 159 |
| Comparative Sample | | | | | |
| 2-9 | Flake Graphite Cast Iron | 1 | 2 | 3 | 3 |
| 2-10 | Aluminum | 1 | 1 | 2 | 2 |

As can be seen from the results of the experiment shown in Table 10, the seizure loads were extremely high in the inventive samples, in which members forming the sliding surfaces were made of ceramics (monolithic ceramics, composite materials), as compared with the comparative samples. Thus, it has been proved that seizure of the sliding surfaces is hardly caused in the inventive samples also in an atmosphere of a cooling medium containing fluorine. Further, it has been proved that the load at which seizure occurs is increased as the surface roughness is reduced. Particularly, it has been proved that the seizure load is extremely increased when the surface roughness is not more than 0.1 μm Ra.

EXAMPLE 8

In swash plate compressors for car air conditioners, shoes that are to be in contact with swash plates made of carbon fiber reinforced carbon composite materials were respectively prepared from silicon nitride, boron nitride, titanium nitride particle dispersion-strengthened silicon nitride and bearing steel. These shoes were employed for evaluating peripheral speeds at which seizure resulted between the shoes and the swash plates while using HFC134a as a cooling medium and polyalkylene glycol as a lubricant. At this time, surface roughness levels of sliding surfaces of the shoes were set at 0.1 μm Ra. Determinations as to whether or not the shoes seized were made based on the occurrence of abnormal sounds and abnormal increases of driving current values. The results of this experiment are shown in Table 11. Referring to the Table, Sample Nos. 3–1 to 3—3 are inventive samples, and Sample No. 3–4 is a comparative sample.

TABLE 11

| No. | | Material of Shoe | Seizure Peripheral Speed (m/sec.) |
|---|---|---|---|
| Inventive Sample | 3-1 | Silicon Nitride | 20 |
| | 3-2 | Boron Nitride | 18 |
| | 3-3 | Titanium Nitride Particle Dispersion-Strengthened Silicon Nitride | 21 |
| Comparative Sample | 3-4 | Bearing Steel | 4 |

As can be seen from Table 11, it has been proved that seizure is caused at extremely high peripheral speeds in the inventive samples in which the materials for the shoes were made of ceramics (monolithic ceramics, composite materials), as compared with the comparative samples. Thus, it has been proved that the sliding surfaces hardly seize in the inventive samples also during cooling by a cooling medium containing fluorine.

EXAMPLE 9

A disk of silicon nitride, a disk which was prepared by depositing a carbon film of 1.0 μm in thickness on a surface of a disk of silicon nitride for forming a sliding surface, and a disk of bearing steel were prepared respectively. Further, rings to be in contact with sliding surfaces of the aforementioned respective disks were prepared from bearing steel. The respective disks and rings were arranged and driven to slide in an atmosphere of HFC134a.

At this time, seizure loads were measured using a ring-on disk friction tester while varying the applied loads under a peripheral speed of 1 m/sec. The results of this experiment are shown in Table 12. Surface roughness values in Table 12 indicate those of base materials for the disks. Surface roughness values of the sliding surfaces of the disks which were provided with carbon films were maintained below the values in the Table.

TABLE 12

| | No. | Sliding Material | Surface Roughness | Seizure Load (kgf/cm$^2$) |
|---|---|---|---|---|
| Inventive Sample | 4-1 | Silicon Nitride Covered with Carbon Film | 0.5 μmRa | 44 |
| | 4-2 | Silicon Nitride Covered with Carbon Film | 0.05 μmRa | 71 |
| Comparative Sample | 4-3 | Silicon Nitride Covered With Carbon Film | 3 μmRa | 12 |
| | 4-4 | Silicon Nitride | 0.5 μmRa | 32 |
| | 4-5 | Bearing Steel | 0.5 μmRa | 2 |

As can be seen from Table 12, it has been proved that seizure loads were higher in the inventive samples, in which first members forming the sliding surfaces were prepared from carbon films, as compared with the comparative samples. Thus, it has been proved that seizure is hardly caused in the sliding surfaces of the inventive samples also in an atmosphere of a cooling medium containing fluorine.

EXAMPLE 10

Disks were prepared by forming diamond-like carbon films of 3 μm in thickness on sliding surfaces of respective disks of silicon nitride and high speed steel by CVD. Further, disks of silicon nitride were prepared. Rings comprising sliding surfaces to be in contact with those of the respective disks were prepared from bearing steel. The respective disks and rings were arranged and driven to slide in liquid HFC134a. At this time, seizure loads were measured through a ring-on-disk friction tester while varying the applied loads under a peripheral speed of 1 m/sec. The results of its experiment are shown in Table 13. Surface roughness values appearing in Table 13 indicate those of base materials for the disks. Surface roughness values of the sliding surfaces of the disks provided with the carbon films were maintained below the values appearing in the Table.

TABLE 13

| | No. | Sliding Material | Surface Roughness | Seizure Load (kgf/cm$^2$) |
|---|---|---|---|---|
| Inventive Sample | 5-1 | Silicon Nitride covered with Diamond-Like Carbon | 0.5 μmRa | 64 |
| | 5-2 | Silicon Nitride covered with Diamond-Like Carbon | 0.05 μmRa | 96 |
| Comparative Sample | 5-3 | Silicon Nitride covered with Diamond-Like Carbon | 3 μmRa | 15 |
| | 5-4 | High-Speed Steel covered with Diamond-like Carbon | 0.5 μmRa | 2.3 |
| | 5-5 | Silicon Nitride | 0.5 μmRa | 32 |

As can be seem from Table 13, seizure loads were extremely high in the inventive samples, in which first members forming the sliding surfaces had the diamond-like carbon films, as compared with the comparative samples. Thus, it has been proved that the sliding surfaces hardly seize in the inventive samples also in an atmosphere of a cooling medium containing fluorine.

EXAMPLE 11

Disks were respectively prepared from alumina, zirconia, silicon carbide, silicon nitride, aluminum nitride and high-speed steel, and surface roughness values of sliding surfaces were finished to be 0.05 μm Ra, 0.5 μm Ra and 3 μm Ra respectively. Rings having sliding surfaces to be in contact with those of the respective disks were prepared from flake graphite cast iron. The respective disks and rings were arranged and driven to slide in gas HFC134a. At this time, a ring-on-disk friction test was made under a peripheral speed of 1 m/sec. and a load of 10 kgf, to measure the resulting amounts of wear of the disks. The occurrence of seizure was determined at a point of time when an echo was generated during the test and the tester vibrated. Results of this experiment are shown in Table 14. Referring to the Table, rings of bearing steel were employed as for comparative samples Nos. 6-7 to 6-11.

TABLE 14

| | | Depth of Wear (μm) | | |
|---|---|---|---|---|
| No. | Sliding Material | 3 μmRa | 0.5 μmRa | 0.05 μmRa |
| Inventive Sample | | | | |
| 6-1 | Alumina | 10.2 | 3.1 | 1.9 |
| 6-2 | Zirconia | 8.9 | 2.7 | 1.6 |
| 6-3 | Silicon Carbide | 12.4 | 4.8 | 3.2 |
| 6-4 | Silicon Nitride | 2.3 | 0.5 | 0.04 |
| 6-5 | Aluminum Nitride | 11.7 | 4.2 | 2.8 |
| Comparative Sample | | | | |
| 6-6 | High-Speed Steel | | Seizure | |
| 6-7 | Alumina (Ring: Bearing Steel) | | 7.2 | |
| 6-8 | Zirconia (Ring: Bearing Steel) | | 6.3 | |
| 6-9 | Silicon Carbide (Ring: Bearing Steel) | | 9.4 | |
| 6-10 | Silicon Nitride (Ring: Bearing Steel) | | 1.5 | |
| 6-11 | Aluminum Nitride (Ring: Bearing Steel) | | 8.6 | |

As can be seen from Table 14, it has been proved that the inventive samples, in which members forming the sliding surfaces were made of ceramics and counter members were made of cast iron, were excellent in wear resistance.

Then, the sliding surfaces were analyzed by ESCA (Electron Spectroscopy for Chemical Analysis), whereby it was proved that films formed on the sliding surfaces during sliding were mainly composed of carbon. From this, it has been proved that the sliding surfaces were excellent in wear resistance in the inventive samples having films mainly composed of carbon which were formed during sliding. Thus, it has been proved that sliding surfaces are excellent in wear resistance in the inventive samples also in an atmosphere of a cooling medium containing fluorine.

As hereinabove described, the slide member according to the present invention is a slide member having excellent wear resistance, which can be used under severe sliding conditions of high-speed sliding or the like. Thus, the inventive slide member is useful as a bearing member for a high-speed machine which rotates at a high speed or for an office automation product. Further, the inventive slide member is useful as a sliding component for a compressor of a refrigerator, a freezer or a car air conditioner employing a fluorocarbon containing no chlorine as a cooling medium.

Although the invention has been described with reference to specific example embodiments, it will be appreciated that it is intended to cover all modifications and equivalents within the scope of the appended claims.

We claim:

1. A slide system comprising a cooling medium containing fluorine and a slide member comprising a sliding surface arranged in an atmosphere of said cooling medium, wherein said sliding surface includes ceramic and has a surface roughness of not more than 0.5 μm in center line average roughness Ra, and wherein said ceramic contains crystal grains in a linear density of at least 35 per 30 μm in length with a boundary phase volume ratio of not more than 15 volume %, and contains pores of not more than 20 μm in maximum diameter in a content of not more than 3%.

2. The slide system in accordance with claim 1, wherein said ceramic is a silicon based ceramic.

3. The slide system in accordance with claim 1, wherein said ceramic includes an $Si_3N_4$ phase.

4. The slide system in accordance with claim 1, wherein said ceramic includes a silicon nitride sintered body.

5. The slide system in accordance with claim 4, wherein said silicon nitride sintered body contains said crystal grains in said linear density of at least 35 per 30 μm in length with said boundary phase volume ratio of not more than 15 volume %, and contains said pores of not more than 20 μm in maximum diameter in said content of not more than 3%.

6. The slide system in accordance with claim 1, further comprising a film mainly composed of elemental carbon formed on said sliding surface by sliding action of said slide member in said cooling medium.

7. The slide system in accordance with claim 1, wherein said cooling medium contains no chlorine.

8. The slide system in accordance with claim 1, wherein said surface roughness of said sliding surface is not more than 0.1 μm in center line average roughness Ra.

9. A slide system comprising a cooling medium containing fluorine, a first slide member part having a first sliding surface arranged in an atmosphere of said cooling medium, and a second slide member part having a second sliding surface arranged to be in contact with said first sliding surface, wherein said first slide member part comprises a ceramic, said first sliding surface has a surface roughness of not more than 0.5 μm in center line average roughness Ra, and said second slide member part comprises a material containing free carbon.

10. The slide system in accordance with claim 9, wherein said material containing free carbon is cast iron.

11. The slide system in accordance with claim 9, wherein said ceramic is a silicon based ceramic.

12. The slide system in accordance with claim 9, wherein said ceramic includes an $Si_3N_4$ phase.

13. The slide system in accordance with claim 9, wherein said ceramic includes a silicon nitride sintered body.

14. The slide system in accordance with claim 13, wherein said silicon nitride sintered body contains crystal grains in a linear density of at least 35 per 30 μm in length with a boundary phase volume ratio of not more than 15 volume %, and contains pores of not more than 20 μm in maximum diameter in a content of not more than 3%.

15. The slide system in accordance with claim 9, wherein said ceramic contains crystal grains in a linear density of at least 35 per 30 μm in length with a boundary phase volume ratio of not more than 15 volume %, and contains pores of not more than 20 μm in maximum diameter in a content of not more than 3%.

16. The slide system in accordance with claim 9, further comprising a film mainly composed of elemental carbon formed on at least said first sliding surface by sliding action of said first sliding surface on said second sliding surface within said cooling medium.

17. The slide system in accordance with claim 9, further comprising a film mainly composed of elemental carbon provided on said first sliding surface.

18. The slide system in accordance with claim 17, wherein said film contains about 70 weight % of carbons and about 10 weight % of elements of said first slide member.

19. The slide system in accordance with claim 18, wherein said film further contains about 20 weight % of hydrogen.

20. The slide system in accordance with claim 9, wherein said cooling medium contains no chlorine.

21. The slide system in accordance with claim 9, wherein said surface roughness of said first sliding surface is not more than 0.1 μm in center line average roughness Ra.

22. A slide system comprising a cooling medium containing fluorine, a first slide member part comprising a ceramic and having a first sliding surface including a film mainly composed of elemental carbon provided thereon and being arranged in said cooling medium, and a second slide member part having a second sliding surface arranged in contact with said film on said first sliding surface in said cooling medium, wherein said first sliding surface has a surface roughness of not more than 0.5 μm in center line average roughness Ra, and wherein said film contains about 70 weight % of carbon and about 10 weight % of elements of said first slide member.

23. The slide system in accordance with claim 22, wherein said film further contains about 20 weight % of hydrogen.

24. The slide system in accordance with claim 22, wherein said film further contains about 20 weight % of at least one element of said cooling medium.

25. A slide system comprising a cooling medium containing fluorine and not containing chlorine, a first slide member part comprising a ceramic and having a first sliding surface arranged in said cooling medium, and a second slide member part having a second sliding surface arranged in contact with said first sliding surface in said cooling medium, wherein said first sliding surface has a surface roughness of not more than 0.1 μm in center line average roughness Ra.

26. A slide system comprising a cooling medium containing fluorine, a first slide member part comprising a ceramic and having a first sliding surface including a film mainly composed of elemental carbon provided thereon and being arranged in said cooling medium, and a second slide member part having a second sliding surface arranged in contact with said film on said first sliding surface in said cooling medium, wherein said first sliding surface has a surface roughness of not more than 0.5 μm in center line average roughness Ra, and wherein said film is a diamond-like carbon film.

* * * * *

UNITED STATES PATENT AND TRADEMARK OFFICE
CERTIFICATE OF CORRECTION

PATENT NO. : 5,776,600

DATED : Jul. 7, 1998

INVENTOR(S) : Katayama et al.

It is certified that error appears in the above-identified patent and that said Letters Patent is hereby corrected as shown below:

In [57] Abstract:
    line 2, replace "a has" by --has a--;
    line 11, after "in" delete "an".

Col. 8, line 32, before "are" replace "5E" by --5B--.

Col. 9, line 13, after "least" replace "5 MPa-m$^{½}$" by --5 MPa·m$^{½}$--;
    line 58, after "products" replace "(P-V" by --(P·V--.

Col. 12, line 9, before "crystallization" replace "a" by --$\alpha$--;
    line 33, before "Test" replace "5 MPa-m$^{½}$." by --5 MPa·m$^{½}$.--;
    line 39, before "show" replace "a to e" by --a to e--.

Col. 13, line 9, after "sample" replace "a" by --a--;
    line 10, after "sample" replace "b" by --b--;
    line 27, after "sample" (first occurrence) replace "a" by --a--; after "sample" (second occurrence) replace "b" by --b--;
    line 60, after "sample" replace "a" by --a--.

Col. 14, line 1, after "sample" replace "a" by --a--;
    line 2, after "sample" replace "b" by --b--.

Col. 15, line 10, after "remainder" insert --,--;
    line 11, after "weight %" insert --,--.

UNITED STATES PATENT AND TRADEMARK OFFICE
CERTIFICATE OF CORRECTION

PATENT NO. : 5,776,600

DATED : Jul. 7, 1998

INVENTOR(S) : Katayama et al.

It is certified that error appears in the above-identified patent and that said Letters Patent is hereby corrected as shown below:

Col. 20, line 13, after "of" replace "carbons" by --carbon,--.

Signed and Sealed this

Twenty-second Day of December, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,776,600
DATED : Jul. 7, 1998
INVENTOR(S) : Katayama et al.

It is certified that error appears in the above-identified patent and that said Letters Patent is hereby corrected as shown below:

On the Title Page: in [62] please replace the "Related U. S. Application Data" to read as follows:
--Division of Ser. No. 150,189, Nov. 30, 1993; filed as PCT/JP93/00385, March 29, 1993, published as WO93/20023, October 14, 1993, Pat. No. 5,543,371.--.

Signed and Sealed this

Twenty-seventh Day of April, 1999

*Attest:*

Q. TODD DICKINSON

*Attesting Officer*     *Acting Commissioner of Patents and Trademarks*